United States Patent
Kobayashi

[11] Patent Number: 5,943,183
[45] Date of Patent: Aug. 24, 1999

[54] RECORDING OR REPRODUCING APPARATUS HAVING CASSETTE LID OPENING DEVICE

[75] Inventor: Junji Kobayashi, Tokyo, Japan

[73] Assignee: Canon Kabushiki Kaisha, Tokyo, Japan

[21] Appl. No.: 08/914,969

[22] Filed: Aug. 20, 1997

Related U.S. Application Data

[63] Continuation of application No. 08/426,956, Apr. 24, 1995, abandoned.

[30] Foreign Application Priority Data

Apr. 28, 1994 [JP] Japan .................................. 6-092196

[51] Int. Cl.$^6$ .................................................. G11B 5/016
[52] U.S. Cl. ............................................................ 360/96.5
[58] Field of Search ................................ 360/90, 93, 94, 360/95, 96.1, 96.5, 96.6, 85; 242/335, 336, 337.1, 338, 341, 346, 347.1

[56] References Cited

U.S. PATENT DOCUMENTS

| | | | |
|---|---|---|---|
| 5,289,324 | 2/1994 | Katoku et al. | 360/96.5 |
| 5,291,354 | 3/1994 | Kim | 360/96.5 |
| 5,293,550 | 3/1994 | Toyoguchi et al. | 360/96.5 |
| 5,450,259 | 9/1995 | Cho et al. | 360/96.6 |
| 5,497,279 | 3/1996 | Nishijima et al. | 360/96.5 |
| 5,500,778 | 3/1996 | Ahn | 360/96.5 |
| 5,523,907 | 6/1996 | Seo et al. | 360/96.5 |
| 5,687,040 | 11/1997 | Shiokawa et al. | 360/96.6 |

FOREIGN PATENT DOCUMENTS

| | | | |
|---|---|---|---|
| 63-253563 | 10/1988 | Japan | 360/96.5 |
| 01311449 | 12/1989 | Japan | 360/96.5 |
| 02210656 | 8/1990 | Japan | 360/96.5 |

*Primary Examiner*—Allen T. Cao
*Attorney, Agent, or Firm*—Robin, Blecker & Daley

[57] ABSTRACT

A cassette lid opening device for moving a lid of a cassette toward an open position, comprises a holder for holding the cassette inserted into the holder, an opening member arranged to come in contact with a lid of the cassette in association with a downward movement of the holder and to move the lid of the cassette to the open position, the opening member including a first contact part arranged to come in contact with a front end of the cassette inserted into the holder and a second contact part arranged to come in contact with a lower end of the lid of the cassette during the downward movement of the holder, and an urging member for urging the opening member in a direction opposite to a direction in which the cassette is inserted.

27 Claims, 6 Drawing Sheets

RECORDING OR REPRODUCING APPARATUS HAVING CASSETTE LID OPENING DEVICE

This is a continuation under 37 CFR 1.62 of prior application Ser. No. 08/426,956, filed Apr. 24, 1995 abandoned.

BACKGROUND OF THE INVENTION

1. Field of the Invention

The present invention relates to a device for opening a cassette lid by means of rotating movement when a cassette is moved from an upper position to a lower position in an apparatus such as a cassette video tape recorder (VTR).

2. Description of the Related Art

Figure 1:
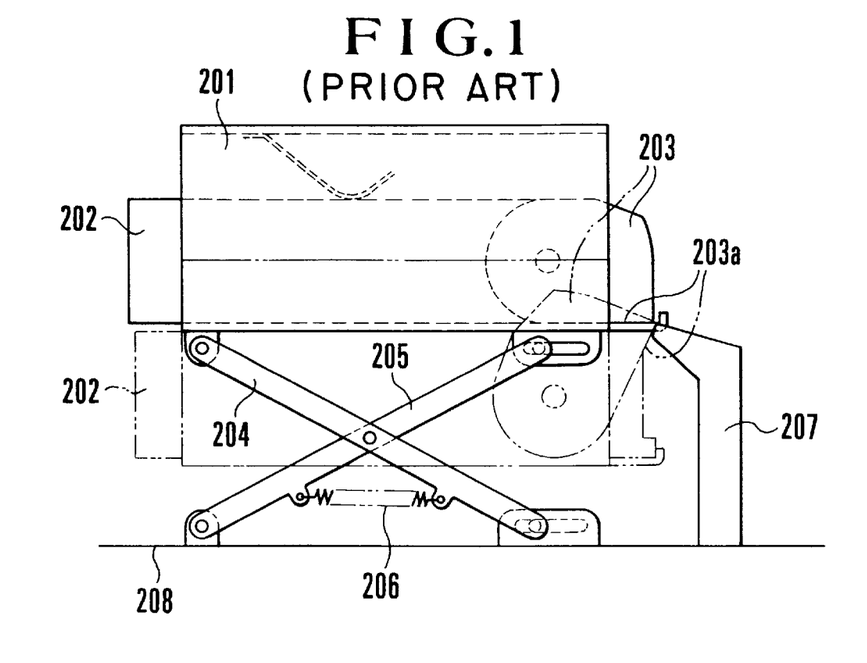
FIG. 1 is a side view of a conventional cassette lid opening device wherein a cassette inserted insufficiently in a cassette holder is in the middle of a downward movement operation.

In conventional techniques of cassette VTRs, as shown in FIG. 1, a cassette 202 inserted in a cassette holder 201 is moved downward from an upper position (insertion position) to a lower position (loaded position). During this lowering operation, a cassette lid 203, which is disposed on the front side of the cassette 202 in such a manner that it can be rotated freely, is opened and a part of a tape is pulled out from the cassette 202. In FIG. 1, reference numerals 204 and 205 denote arms for moving the cassette holder 201 up and down, and reference numeral 206 denotes an up-spring for urging the cassette holder 201 toward the upper position.

In the above arrangement, an opening member 207 for opening the cassette lid 203 is fixed to a chassis 208 of the main body of the VTR so that when the cassette 202 is moved downward the lower end 203a of the cassette lid 203 comes in contact with the opening member 207 and thus the opening member 207 pushes the cassette lid 203 upward thereby rotating the cassette lid 203 toward an open position. When the cassette 202 has reached the lowest position, the cassette lid 203 is fully opened.

In the conventional arrangement described above, however, since the opening member 207 is positioned relative to the chassis 208, if a cassette 202 has a thin cassette lid 203 (that is, the thickness of the lid in the direction from the front side to the back side of the cassette is small) and thus only a small portion can come in contact with the opening member 207, a contact failure between the lid opening member and the cassette lid often occurs owing to variations or clearances in dimensions of a cassette loading mechanism, or owing to insufficient insertion of the cassette 202 into the cassette holder 201, which results in an opening failure of the cassette lid.

SUMMARY OF THE INVENTION

According to an aspect of the present invention, there is provided a cassette lid opening device for moving a lid of a cassette toward an open position, comprising: a holder for holding the cassette inserted into the holder; an opening member arranged to come in contact with the lid of the cassette in association with a downward movement of the holder and to move the lid of the cassette to the open position, the opening member including: a first contact part arranged to come in contact with a front end of the cassette inserted into the holder; and a second contact part arranged to come in contact with a lower end of the lid of the cassette during the downward movement of the holder; and an urging member for urging the opening member in a direction opposite to a direction in which the cassette is inserted.

According to another aspect of the present invention, there is provided an apparatus for recording or reproducing information on or from a recording medium accommodated in a cassette, comprising: a head for recording or reproducing information on or from the recording medium; a holder for holding the cassette inserted into the holder; an opening member arranged to come in contact with a lid of the cassette in association with a downward movement of the holder and to move the lid of the cassette to an open position, the opening member including: a first contact part arranged to come in contact with a front end of the cassette inserted into the holder; and a second contact part arranged to come in contact with a lower end of the lid of the cassette during the downward movement of the holder; and an urging member for urging the opening member in a direction opposite to a direction in which the cassette is inserted.

Other objects and aspects of the invention will become apparent from the following description of embodiments with reference to the accompanying drawings.

DETAILED DESCRIPTION OF THE PREFERRED EMBODIMENTS

Preferred embodiments of cassette lid opening devices for use in cassette VTRs according to the present invention will be described in detail below referring to the accompanying drawings.

FIGS. 2–8 illustrate a first embodiment of the invention.

Figure 2:
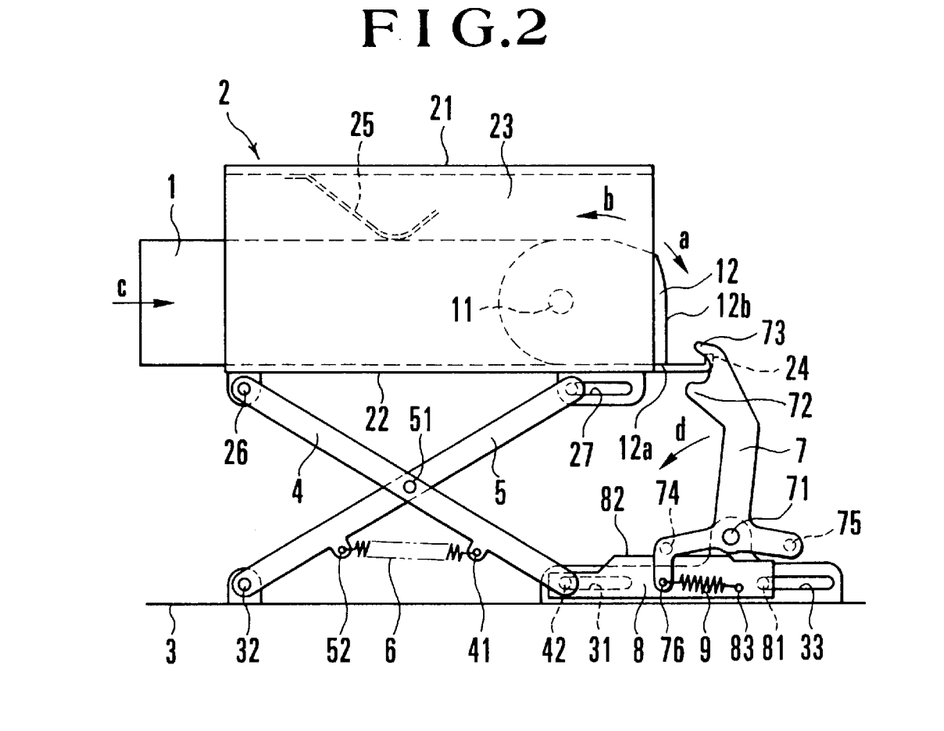
FIG. 2 is a side view of a first embodiment of a cassette lid opening device according to the present invention wherein a cassette is in the middle of an insertion operation into a cassette holder.

In FIG. 2, reference numeral 2 denotes a cassette having a cassette lid 12 that can rotate about a pin 11 in directions denoted by arrows "a" and "b". In a normal state, the cassette lid 12 is urged by a lid closing spring (not shown) in the direction denoted by the arrow "a" to a closed position.

Reference numeral 2 denotes a cassette holder for holding the cassette 1 wherein the cassette holder 2 is composed of an upper plate 21, a lower plate 22, and side plates 23. The cassette 1 is inserted into the cassette holder 2 in the direction denoted by the arrow "c" until the front end 1a (refer to FIG. 5) of the cassette 1 comes in contact with a stopper 24 disposed at the front end of the lower plate 22 and stops there. The cassette 1 is pressed downward by a leaf spring 25 fixed to the inner surface of the upper plate 21.

In FIG. 2, reference numeral 3 denotes a chassis of the main body of the VTR, reference numeral 4 denotes an arm wherein one end of the arm 4 is fitted rotatably to a supporting part 26 of the cassette holder 2 and the other end is fitted into a long guide hole 31 formed in the chassis 3 in such a manner that the end portion can slide along the guide hole 31, reference numeral 5 denotes an arm wherein one end of the arm 5 is fitted rotatably to a supporting part 32 of the chassis 3, the other end is fitted into a long guide hole 27 of the cassette holder 2 in such a manner that the end portion can slide along the guide hole 27. The arms 4 and 5 are fitted to each other via a pin 51 in such a manner that the arms 4 and 5 can rotate around the pin 51. Furthermore, an up-spring 6 is stretched between a hook 52 of the arm 5 and a hook 41 of the arm 4 so that the cassette holder 2 is urged upward.

Reference numeral 7 denotes an opener (cassette lid opening member) having one of the important features of the present invention. The opener 7 is disposed on the chassis 3 in such a manner that the opener 7 can rotate about the pin 71. At the upper end portion, the opener 7 has a U-shaped part formed in an integral fashion wherein one branch portion of the U-shaped part serves as a lid lower end contact part 72 that can come in contact with the lower end 12a of the cassette lid 12, and the other branch portion serves as a lid front end contact part 73 that can come in contact with the front end 12b of the cassette lid 12.

Reference numeral 8 denotes a limiting plate disposed between the guide hole 31 of the chassis 3 and the arm 4 in such a manner that the limiting plate 8 can rotate about the hinge pin 42 of the arm 4 wherein a projecting hinge pin 81 disposed at the other end of the limiting plate 8 is fitted, in a slidable fashion, to a guide hole 33 formed in the chassis 3. The upper end portion 82 partially projecting from the limiting plate 8 can come in contact with the pins 74 and 75 projecting from the opener 7. An open spring 9 is stretched between a hook 83 of the limiting plate 8 and a hook 76 of the opener 7.

In this arrangement shown in FIG. 2, the opener 7 is urged by the open spring 9 in the circumferential direction denoted by the arrow "d" wherein the pin 74 of the opener 7 comes in contact with the upper end portion 82 of the limiting plate 8 so that the opener 7 is stopped against the above urging force. In this position, the lid front end contact part 73 of the opener 7 is located at a position behind a stopper 24 of the cassette holder 2 in the cassette inserting direction indicated by the arrow "c".

Figure 3:
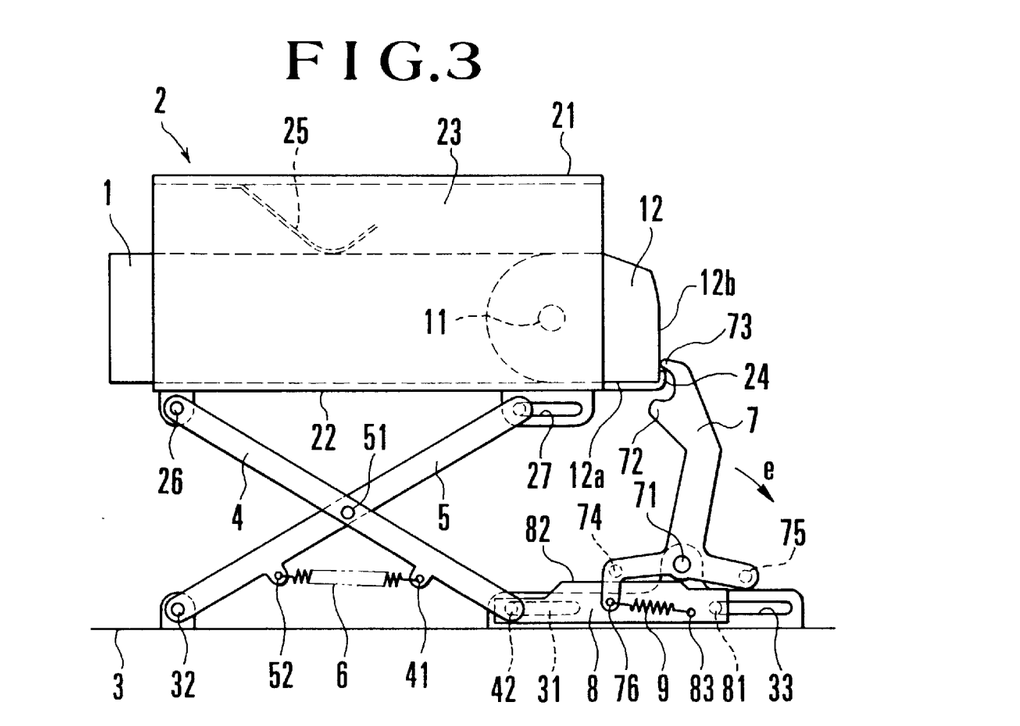
FIG. 3 is a side view of the first embodiment, illustrating a state in which the cassette has been completely inserted into the cassette holder.

In this state shown in FIG. 2, if the cassette 1 is inserted further in the cassette holder 2 in the direction denoted by the arrow "c", the front end 12b of the cassette lid 12 comes in contact with the lid front end contact part 73 of the opener 7 as shown in FIG. 3. As a result, the opener 7 is rotated in the direction denoted by the arrow "e" until the front end 1a of the cassette 1 (refer to FIG. 5) has come in contact with the stopper 24 of the cassette holder 2 and stops at that position. In this state, the open spring 9 is in a compressed state in which the torque applied to the opener 7 in the direction denoted by the arrow "d" is not so strong to push back the cassette 1, and therefore the cassette 1 is held in a stationary state between the leaf spring 25 of the cassette holder 2 and the lower plate 22.

Figure 4:
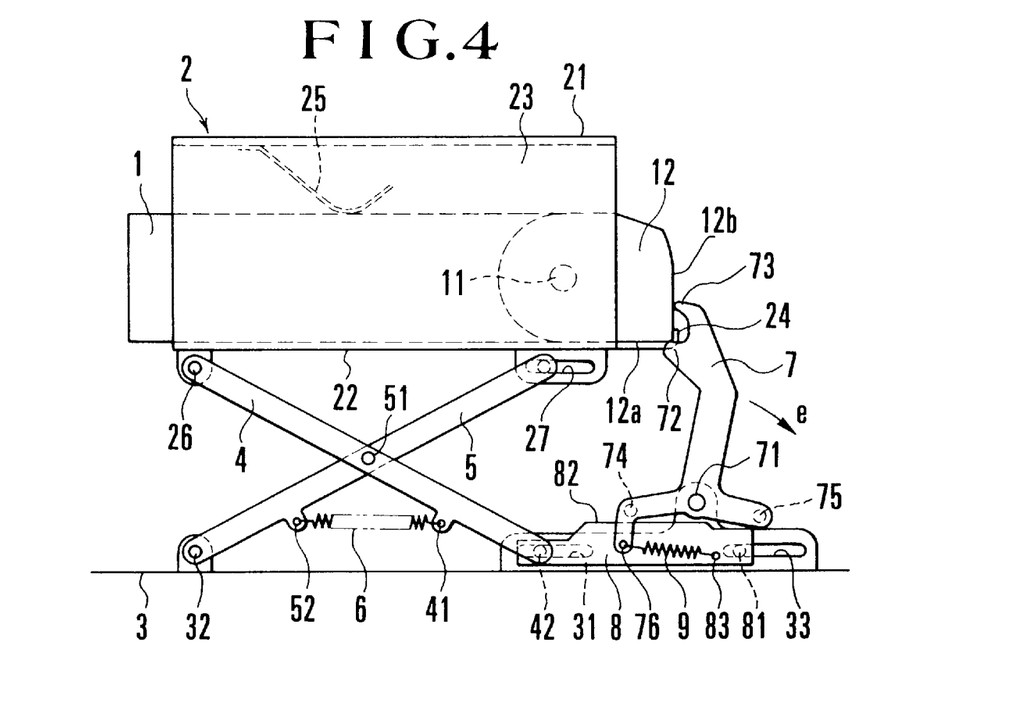
FIG. 4 is a side view of the first embodiment, illustrating a state in which the lower end of the cassette lid is in contact with the lid lower end contact part of the lid opening device.
Figure 5:
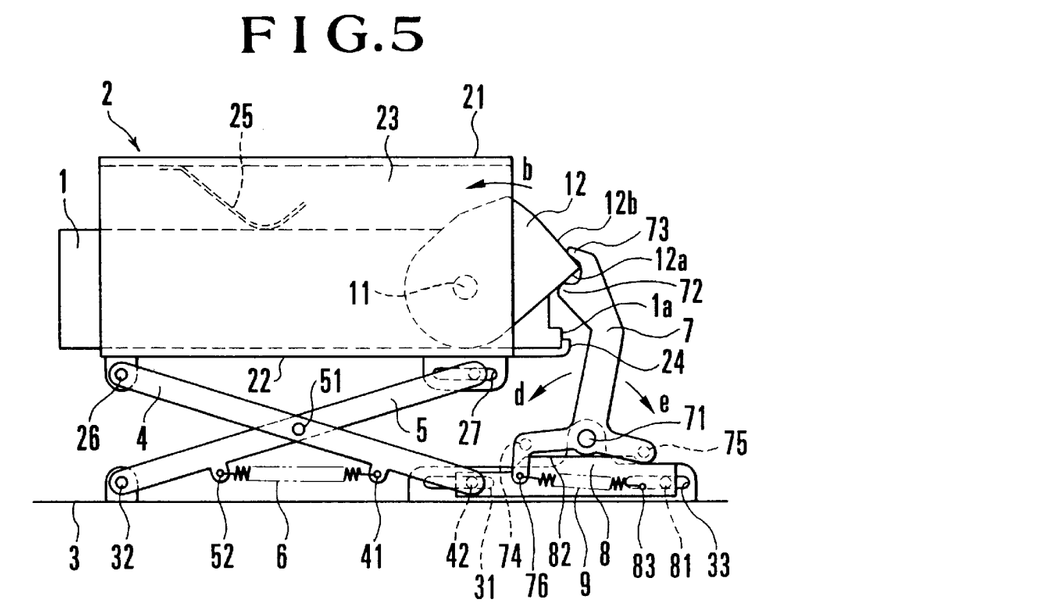
FIG. 5 is a side view of the first embodiment, illustrating a state in which the cassette is in the middle of a downward movement operation.

In this state, if the cassette holder 2 is moved downward against the force of the up-spring 6, the position of the lid lower end contact part 72 of the opener 7 is limited directly by the front end 12b of the cassette lid 12 as shown in FIG. 4 and thus the lid lower end contact part 72 inevitably comes in contact with the lower end 12a of the lid 12 of the cassette 1. As a result, the lid front end contact part 73 of the opener 7 is pushed by the front end portion 12b of the cassette lid 12 and the opener 7 rotates in the direction denoted by the arrow "e" against the force of the open spring 9. Thus, the cassette lid 12 of the cassette rotates in the direction denoted by the arrow "b" toward an open position as shown in FIG. 5.

Figure 6:
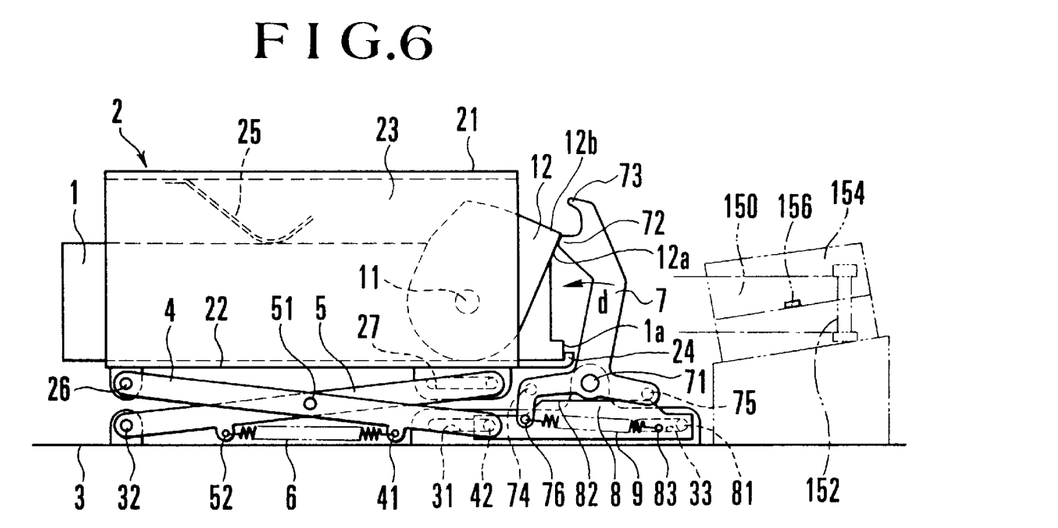
FIG. 6 is a side view of the first embodiment, illustrating a state in which the cassette has been completely loaded.

If the cassette holder 2 is moved downward until it reaches the position shown in FIG. 6, then the cassette holder 2 is held on the chassis 3 by lock means (not shown). In this state, the pin 74 of the opener 7 is released from the contact with the upper end portion 82 of the limiting plate 8. On the other hand, the pin 75 of the opener 7 comes in contact with the upper end portion 82 of the limiting plate 8. As a result, the opener 7 is limited in its position in the direction denoted by the arrow "d" and the lid 12 of the cassette 1 is maintained at the fully open position.

A part of a tape 150 accommodated in the cassette 1 is then pulled out by a guide member 152 and wrapped around a rotary drum 154 so that a head 156 attached to the rotary drum 154 can reproduce or record information from or on the tape 150.

If the cassette holder 2 is released from the holding state shown in FIG. 6, the cassette holder 2 is driven by the up-spring 6 and starts to move upward. The pin 75 of the opener 7 is released from the contact with the upper end portion 82 of the limiting plate 8.

As the cassette holder 2 moves upward, the expansion of the open spring 9 decreases and the torque of the opener 7 in the direction denoted by the arrow "d" also decreases as shown in FIG. 5. The distance between the lid lower end contact part 72 of the opener 7 and the rotation center 11 of the cassette lid 12 decreases, and the torque due to the self-closing force of the cassette lid 12 applied to the opener 7 in the direction denoted by the arrow "e" increases. Furthermore, the front end portion 12b of the cassette lid 12 comes in contact with the lid front end contact part 73 of the opener 7. As a result, the upward movement of the cassette holder 2 forces the opener 7 to rotate in the direction denoted by the arrow "e".

In this way, the opener 7 rotates in the direction denoted by the arrow "e" while maintaining the contact with the cassette lid 12. As a result, the cassette lid 12 is closed. The cassette holder 2 moves further upward via the position shown in FIG. 4 to the highest position shown in FIG. 3. In this state, it becomes possible to remove the cassette 1 from the cassette holder 2.

Figure 7:
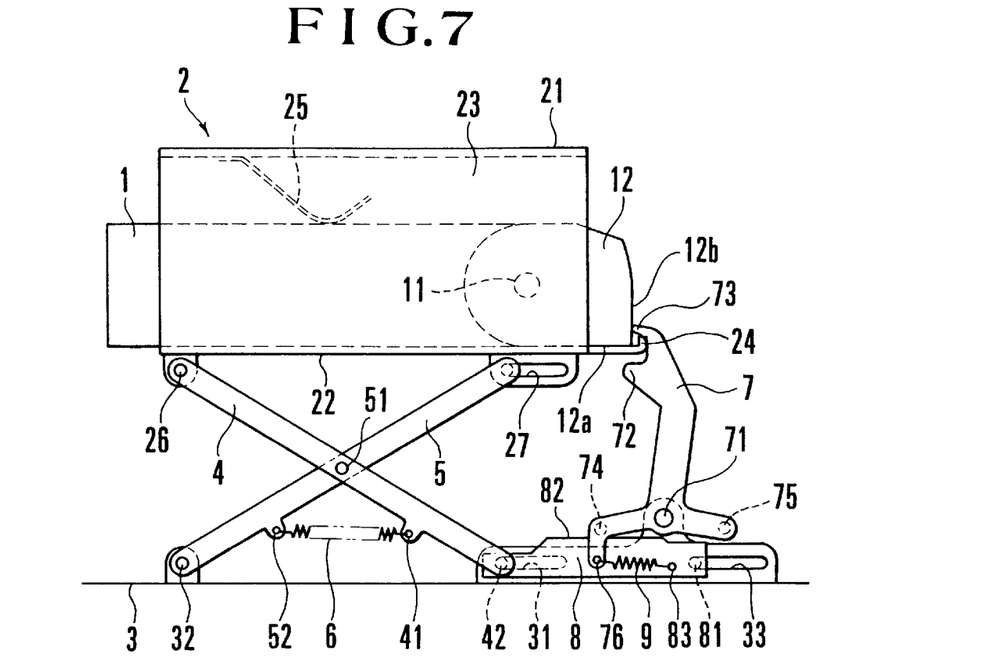
FIG. 7 is a side view of the first embodiment, illustrating a state in which the cassette is inserted insufficiently in the cassette holder.

In the state where the cassette 1 is in the position shown in FIG. 3, if the cassette 1 is not inserted until it comes in contact with the stopper 24 of the cassette holder 2 as shown in FIG. 7, the conventional fixed-type opener 207 will not come in contact with the lower end 203a of the cassette lid 203 or the slanted end portion of the opener will come in contact with the lower end portion 203a of the cassette lid 203. In either case, the cassette lid 203 will not be opened as described earlier referring to FIG. 1.

Figure 8:
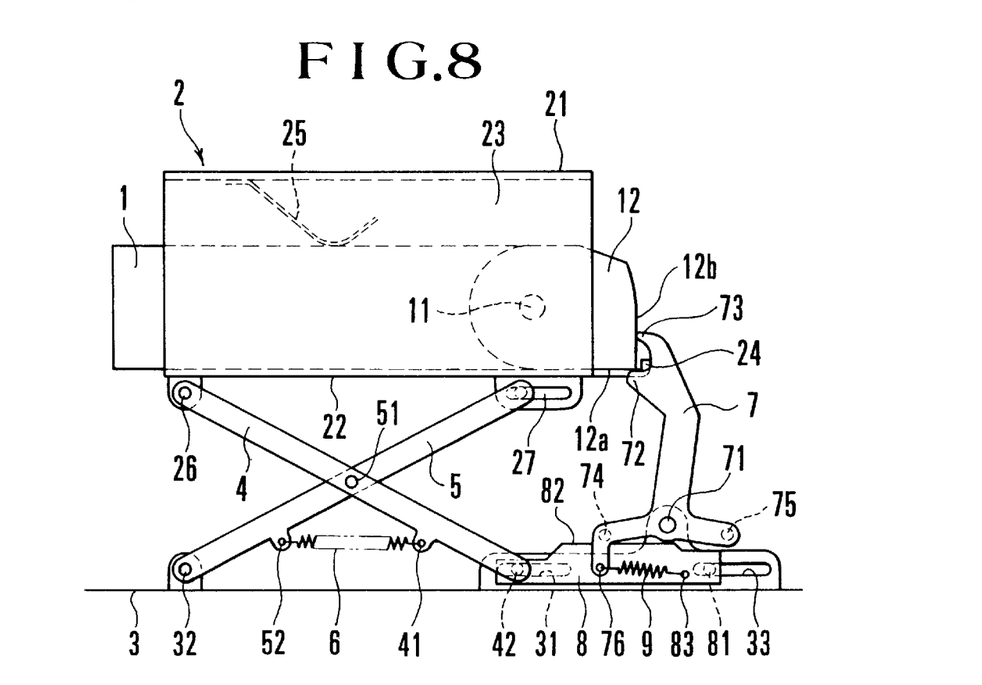
FIG. 8 is a side view of the first embodiment, illustrating a state in which the lid lower end contact part of the opening device is in contact with the lower end of the lid of the cassette inserted insufficiently in the cassette holder.

In contrast, when the opener 7 according to the present invention is employed, the lid lower end contact part 72 of the opener 7 is positioned relative to the front end 12b of the cassette lid 12 as shown in FIG. 7, and therefore it is possible to open the cassette lid 12 as shown in FIG. 8.

In this case, even if the cassette 1 is not perfectly positioned relative to the chassis 3, the position of cassette 1 relative to the chassis 3 is corrected by conical positioning pins disposed on the chassis 3 when the cassette 1 is moved downward. The deviation in the position of the cassette 1 occurs inevitably, to a greater or less extent, also owing to variations or clearances in the dimensions of a cassette attaching mechanism.

In the first embodiment described above, since the opener 7 is disposed on the chassis 8 of the main body of the VTR, it is possible to simplify the structure of the cassette holder 2 and related mechanisms for moving the cassette holder 2 for example up and down.

Now, a second embodiment of the invention will be described below referring to FIGS. 9–12. Unlike the first embodiment in which the opener is disposed on the chassis, an opener is disposed on a cassette holder in the second embodiment.

A cassette 1, a cassette holder 2, and a mechanism for moving the cassette holder up and down employed in the second embodiment are all essentially the same as those in the first embodiment, and therefore these elements will not be described here again.

In the second embodiment, one end of the arm 4 is fitted, in a slidable fashion, to a long guide hole 27 of the cassette holder 2, and the other end is fitted, in a rotatable fashion, to a supporting part 32 of the chassis 3. One end of the arm 5 is fitted, in a slidable fashion, to a long guide hole 31 of the chassis 3, and the other end is fitted, in a rotatable fashion, to a supporting part 26 of the cassette holder 2.

Reference numeral 10 denotes an opener which is one of the important features of the present invention. The opener 10 is disposed on a side face of the cassette holder 2 wherein pins 28 and 29 having a flange are disposed on a side plate 23 of the cassette holder 23 and these pins 28 and 29 are fitted into guide holes 101 and 102 of the opener 10 in such a manner that the opener 10 can move in a plane parallel to the side face of the cassette holder 2. The front end portion of the opener 10 extends exceeding the front end of the cassette holder 2. The opener 10 has a lid front end contact pin 103 which can come in contact with the front end 12b of the cassette lid 12 and also has a lid lower end contact pin 104 which can come in contact with the lower end 12a of the cassette lid 12 (refer to FIG. 11).

The lower end 105 of the opener 10 is in contact with the pin 53 projecting from the arm 5. An open spring 90 is stretched between a hook 43 formed at one end of the arm 4 and a hook 106 formed at the rear end of the opener 10.

Figure 9:
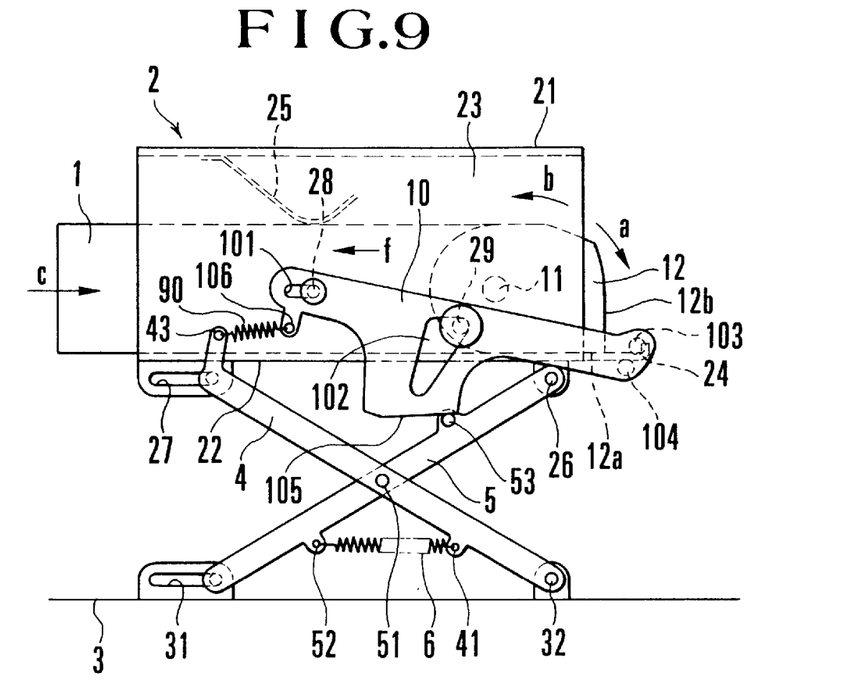
FIG. 9 is a side view of a second embodiment of a cassette lid opening device according to the present invention wherein a cassette is in the middle of an insertion operation into a cassette holder.

In this arrangement shown in FIG. 9, the opener 10 is urged by the open spring 90 in the direction denoted by the arrow "f" wherein the right end of the guide hole 101 of the opener 10 is in contact with the pin 28 of the cassette holder 2 whereby the opener 10 is stopped against the above-described urging force. The lid front end contact pin 103 of the opener 10 is located at the back of the stopper 24 of the cassette holder 2 in the cassette inserting direction indicated by the arrow "c".

Figure 10:
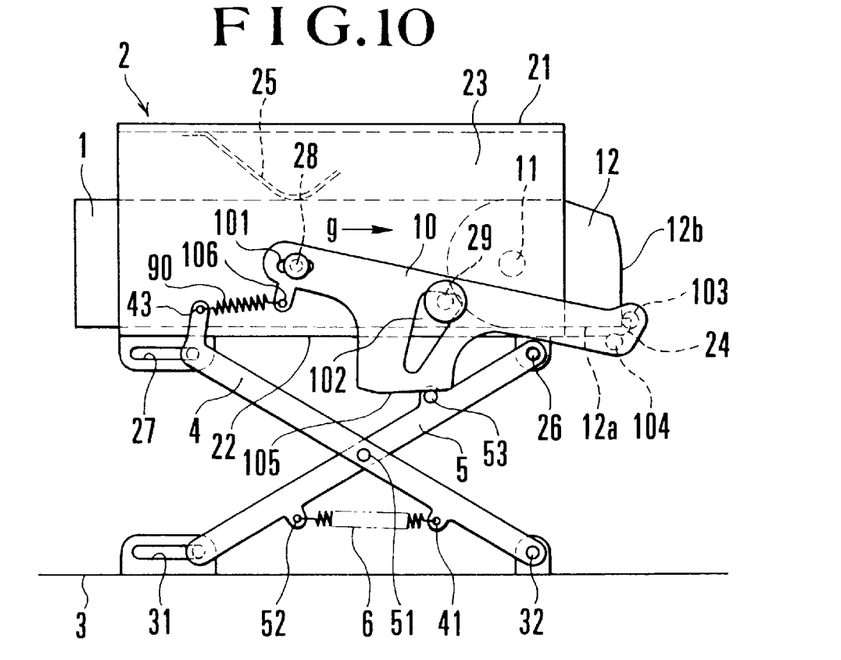
FIG. 10 is a side view of the second embodiment, illustrating a state in which the cassette has been completely inserted into the cassette holder.

In this state, if the cassette 1 is inserted further in the cassette holder 2 in the direction denoted by the arrow "c", the front end 12b of the cassette lid 12 comes in contact with the lid front end contact pin 103 of the opener 10 as shown in FIG. 10. As a result, the opener 10 is moved in the direction denoted by the arrow "g" until the front end 1a of the cassette 1 (refer to FIG. 11) has come in contact with the stopper 24 of the cassette holder 2 and stops at that position. In this state, the open spring 90 is in a compressed state in which the force applied to the opener 10 in the direction denoted by the arrow "f" is not so strong to push back the cassette 1, and therefore the cassette 1 is held in a stationary state between the leaf spring 25 of the cassette holder 2 and the lower plate 22.

Figure 11:
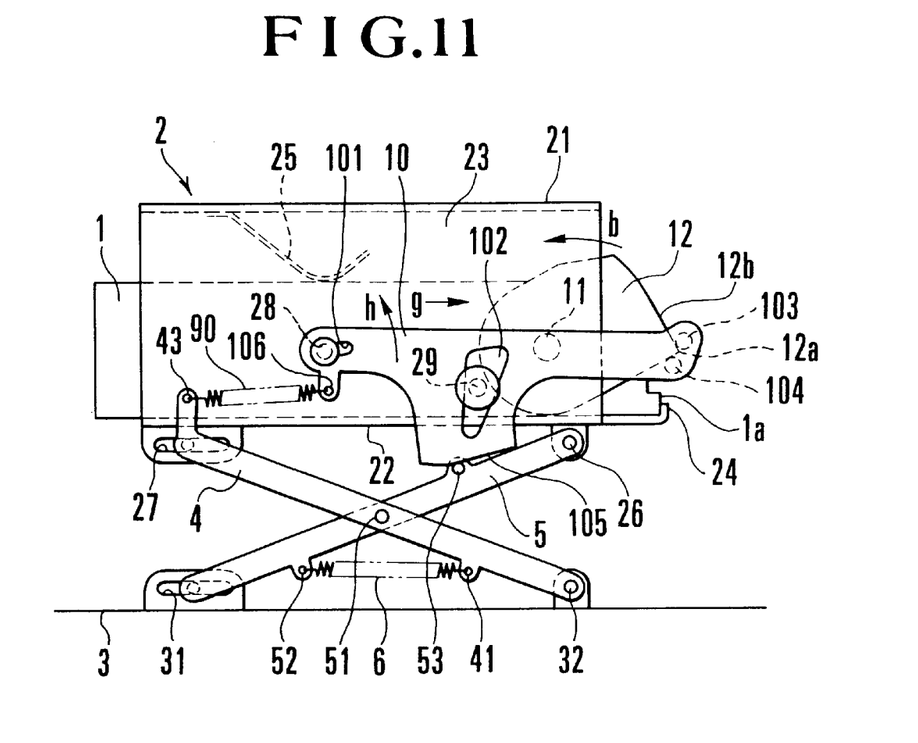
FIG. 11 is a side view of the second embodiment, illustrating a state in which the cassette is in the middle of a downward movement operation.

In this state, if the cassette holder 2 is moved downward as shown in FIG. 11, the pin 53 of the arm 5 pushes up the lower end 105 of the opener 10. As a result, the opener 10 rotates about the pin 28 of the cassette holder 2 in the direction denoted by the arrow "h" against the force of the open spring 90. Since the position of the lid lower end contact pin 104 of the opener 10 is limited directly by the front end 12b of the cassette lid 12, and thus the lid lower end contact pin 104 inevitably comes in contact with the lower end 12a of the cassette lid 12 of the cassette 1. As a result, the lid front end contact pin 103 of the opener 10 is pushed by the front end portion 12b of the cassette lid 12 and the opener 10 escapes in the direction denoted by the arrow "g" against the force of the open spring 90. Thus, the lid 12 of the cassette 1 rotates in the direction denoted by the arrow "b" toward an open position.

Figure 12:
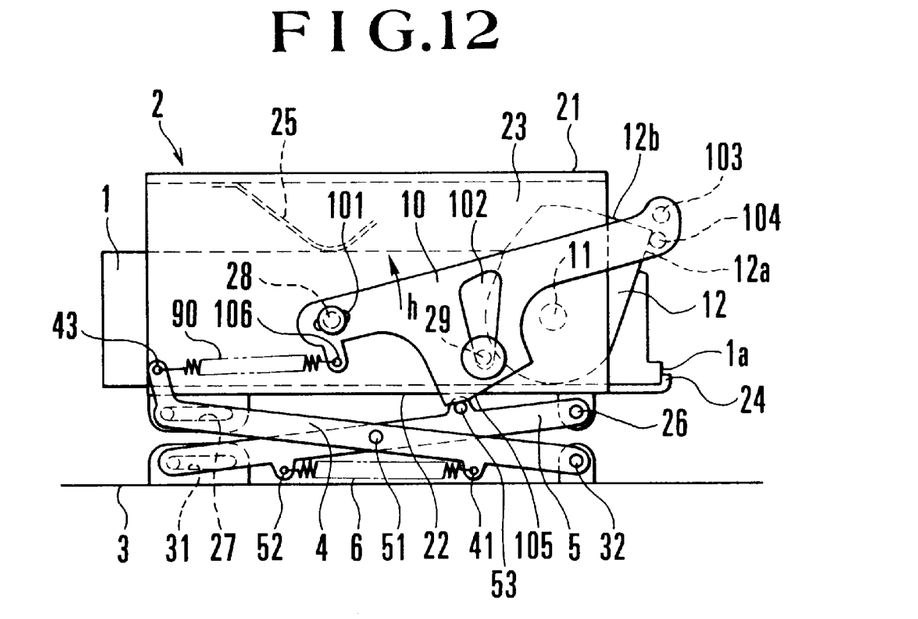
FIG. 12 is a side view of the first embodiment, illustrating a state in which the cassette has been completely loaded.

The cassette holder 2 moves further downward to a position shown in FIG. 12. In this position, the cassette holder 2 is held on the chassis 3 by lock means (not shown). In this state, the movement of the opener 10 in the right and left directions is limited by the pin 29 of the cassette holder 2 wherein the pin 29 is fitted into the guide hole 102 of the opener 10. As a result, the lid lower end contact pin 104 is fixed to a predetermined position, and thus the cassette lid 12 comes to the fully open position. A part of a tape 150 accommodated in the cassette 1 is then pulled out by a guide member 152 in a similar manner to the first embodiment and wrapped around a rotary drum 154 so that information can be reproduced or recorded from or on the tape 150.

After the operation described above, if the cassette holder 2 is moved upward, the cassette lid 12 will be closed according to the steps opposite to those described above.

In this second embodiment, since the opener 10 is disposed on the side of the cassette holder 2, the space for installing the opener 10 on the chassis 3 of the main body of the VTR is no longer required.

While the present invention has been described with reference to specific embodiments, the description is illustrative of the invention and is not to be construed as limiting the invention. Various modifications and applications are possible without departing from the true spirit and scope of the invention.

For example, in the first and second embodiments, the lid front end contact part 73 or pin 103 of the opener 7 or 10 is in contact with the front end 12b of the cassette lid 12. Alternatively, if the cassette 1 has a proper structure, the lid front end contact part 73 or pin 103 of the opener 7 or 10 may be in contact with the front end 1a of the cassette 1.

Furthermore, in the embodiments described above, the position of lid lower end contact part 72 or pin 104 of the opener 7 or 10 in the lowest position of the cassette 1 is limited by the combination of the pin 75 of the opener 7 and the upper end portion 82 of the limiting plate 8 or the combination of the lower part of the guide hole 102 of the opener 10 and the pin 29 of the cassette holder 2. However, the lid 12 can also be opened only by the force of the open spring 9 or 90.

In the above embodiments, a cassette holder of the pop-up type is employed to move a cassette up and down. Alternatively, the present invention may also be applied to a cassette holder of the front loading type. In this case, a cassette is loaded into the cassette holder in a horizontal direction, and the cassette holder moves downward.

In these embodiments, as described above, a cassette lid opening member has a lid contact part which comes in contact with the lower end of a cassette lid when the cassette moves downward thereby opening the cassette lid and also has a cassette contact part which comes in contact with the front end of the cassette when the cassette is inserted into the cassette holder wherein the lid contact part and the cassette contact part are formed as integral parts of the cassette lid opening member. The cassette lid opening member is disposed in such a manner the member is urged in the direction opposite to the cassette insertion direction whereby the position of the lid contact part can be determined not by the chassis or the cassette holder but directly by the front end of the cassette. This arrangement of the invention prevents a contact failure between the lid opening member and the cassette lid, which may otherwise occur due to variations in dimensions of a cassette loading mechanism, clearances, deformation caused by external force, or insufficient insertion of the cassette into the cassette holder. Thus, a great improvement in reliability in the lid opening operation has been achieved.

What is claimed is:

1. A cassette lid opening device for moving a lid of a cassette toward an open position, comprising:

a holder for holding the cassette inserted into said holder;

an opening member rotatably supported in said device and arranged to come in contact with the lid of the cassette in association with a downward movement of said holder and to move the lid of the cassette to the open position, said opening member including:

a first contact part arranged to come in contact with a front end of the cassette inserted into said holder, and a second contact part arranged to come in contact with a lower end of the lid of the cassette during the downward movement of said holder, the first and second contact parts simultaneously engaging the lid when the holder is starting the downward movement; and an urging member for urging said opening member in a direction opposite to a direction in which the cassette is inserted, said first and second contact parts both engaging said lid across a width thereof.

2. A cassette lid opening device according to claim 1, further comprising a chassis for movably supporting said holder, wherein said opening member is disposed on said chassis.

3. A cassette lid opening device according to claim 2, wherein said opening member is rotatably disposed on said chassis.

4. A cassette lid opening device according to claim 3, further comprising a limiting member for limiting a rotating operation of said opening member.

5. A cassette lid opening device according to claim 4, wherein said limiting member is disposed on said chassis in such a manner as to be able to slide in directions in which the cassette is inserted and ejected.

6. A cassette lid opening device according to claim 5, further comprising a plurality of links for moving said holder on said chassis, wherein one end of one of the links is linked to said limiting member.

7. A cassette lid opening device according to claim 5, wherein said urging member is disposed between said opening member and said limiting member.

8. An apparatus for recording or reproducing information on or from a recording medium accommodated in a cassette, comprising:

a head for recording or reproducing information on or from the recording medium;

a holder for holding the cassette inserted into said holder;

an opening member rotatably supported in said apparatus and arranged to come in contact with the lid of the cassette in association with a downward movement of said holder and to move the lid of the cassette to the open position, said opening member including:

a first contact part arranged to come in contact with a front end of the cassette inserted into said holder, and a second contact part arranged to come in contact with a lower end of the lid of the cassette during the downward movement of said holder, the first and second contact parts simultaneously engaging the lid when the holder is starting the downward movement; and an urging member for urging said opening member in a direction opposite to a direction in which the cassette is inserted, said first and second contact parts both engaging said lid across a width thereof.

9. An apparatus according to claim 8, wherein said head is disposed on a rotary drum.

10. An apparatus according to claim 9, wherein said recording medium is a tape, and said apparatus further includes a guide member for wrapping the tape around said rotary drum.

11. An apparatus according to claim 8 or 9, further comprising a chassis for movably supporting said holder, wherein said opening member is disposed on said chassis.

12. An apparatus according to claim 11, wherein said opening member is rotatably disposed on said chassis.

13. An apparatus according to claim 12, further comprising a limiting member for limiting a rotating operation of said opening member.

14. An apparatus according to claim 13, wherein said limiting member is disposed on said chassis in such a manner as to be able to slide in directions in which the cassette is inserted and ejected.

15. An apparatus according to claim 14, further comprising a plurality of links for moving said holder on said chassis, wherein one end of one of the links is linked to said limiting member.

16. An apparatus according to claim 14, wherein said urging member is disposed between said opening member and said limiting member.

17. A cassette lid opening device for moving a lid of a cassette toward an open position, comprising:

a holder for holding the cassette inserted into said holder;

an opening member rotatably supported in said device and having first and second contact parts respectively successively individually engaging different surfaces of said lid in the course of cassette insertion into said holder and movement of said holder to move the lid of the cassette to the open position, the first and second contact parts simultaneously engaging the lid when the holder is starting the downward movement; and an urging member for urging said opening member in a direction opposite to a direction in which the cassette is inserted, said first and second contact parts both engaging said lid across a width thereof.

18. A cassette lid opening device according to claim 17, wherein said first contact part is arranged to engage a front surface of said lid.

19. A cassette lid opening device according to claim 17, wherein said second contact part is arranged to engage an undersurface of said lid.

20. A cassette lid opening device according to claim 18, wherein said second contact part is arranged to engage an undersurface of said lid.

21. A cassette lid opening device for moving a lid of a cassette toward an open position, comprising:

a holder for holding the cassette inserted into said holder;

an opening member rotatably supported in said device and having first and second contact parts, said second contact part coming into contact with a lower end of the cassette after said first contact part contacts a front end of the cassette, the first and second contact parts simultaneously engaging the lid when the holder is starting the downward movement; and an urging member for urging said opening member in a direction opposite to a direction in which the cassette is inserted.

22. A cassette lid opening device for moving a lid of a cassette toward an open position, comprising:

a holder for holding the cassette inserted into said holder;

an opening member rotatably supported in said device and arranged to come in contact with the lid of the cassette in association with a downward movement of said holder and to move the lid of the cassette to the open position, said opening member including:
  a first contact part arranged to come in contact with a front end of the cassette inserted into said holder, and
  a second contact part arranged to come in contact with a lower end of the lid of the cassette during the downward movement of said holder;

an urging member for urging said opening member in a direction opposite to a direction in which the cassette is inserted;

a chassis for movably supporting said holder, wherein said opening member is rotatably disposed on said chassis; and a limiting member for limiting a rotating operation of said opening member and is disposed on said chassis in such a manner as to be able to slide in directions in which the cassette is inserted and ejected.

23. A cassette lid opening device according to claim 22, further comprising a plurality of links for moving said holder on said chassis, wherein one end of one of the links is linked to said limiting member.

24. A cassette lid opening device according to claim 22, wherein said urging member is disposed between said opening member and said limiting member.

25. An apparatus for recording or reproducing information on or from a recording medium accommodated in a cassette, comprising:

a head for recording or reproducing information on or from the recording medium;

a holder for holding the cassette inserted into said holder;

an opening member rotatably supported in said apparatus and arranged to come in contact with the lid of the cassette in association with a downward movement of said holder and to move the lid of the cassette to the open position, said opening member including:
  a first contact part arranged to come in contact with a front end of the cassette inserted into said holder, and
  a second contact part arranged to come in contact with a lower end of the lid of the cassette during the downward movement of said holder;

an urging member for urging said opening member in a direction opposite to a direction in which the cassette is inserted;

a chassis for movably supporting said holder, wherein said opening member is rotatably disposed on said chassis; and a limiting member for limiting a rotating operation of said opening member, said limiting member is disposed on said chassis in such a manner as to be able to slide in directions in which the cassette is inserted and ejected.

26. An apparatus according to claim 25, further comprising a plurality of links for moving said holder on said chassis, wherein one end of one of the links is linked to said limiting member.

27. An apparatus according to claim 25, wherein said urging member is disposed between said opening member and said limiting member.

* * * * *